Figure 1:
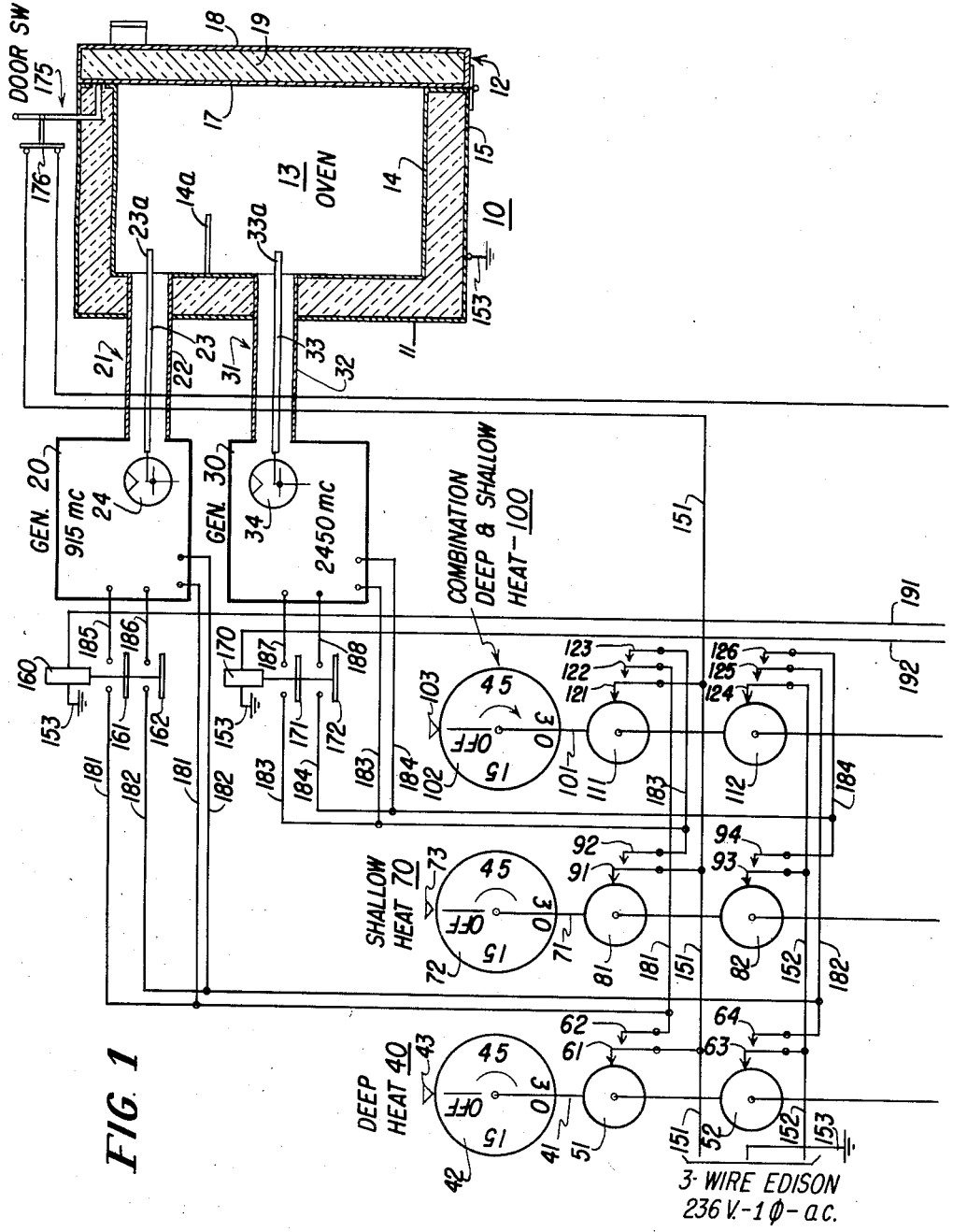

July 21, 1959

H. P. KAMIDE 2,895,828

ELECTRONIC HEATING METHODS AND APPARATUS

Filed Feb. 6, 1958

2 Sheets-Sheet 1

INVENTOR.
Harris P. Kamide
BY
Smith, Prangley, Baird & Clayton
Attys.

July 21, 1959     H. P. KAMIDE     2,895,828
ELECTRONIC HEATING METHODS AND APPARATUS
Filed Feb. 6, 1958     2 Sheets-Sheet 2
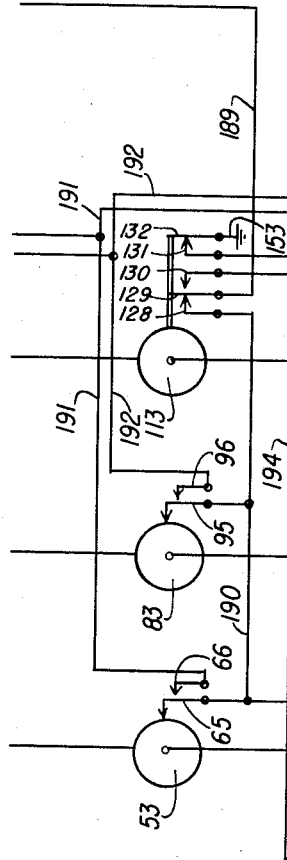
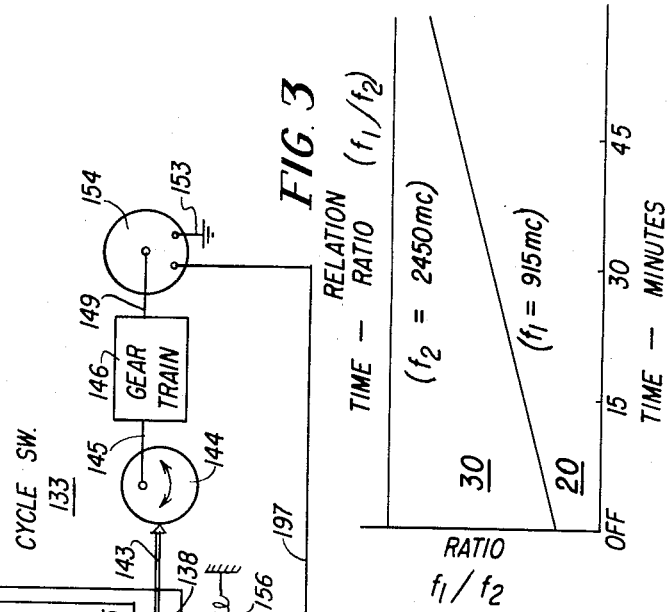
INVENTOR.
Harris P. Kamide
BY
Smith, Brangley, Baird & Clayton
Attys.

United States Patent Office 2,895,828
Patented July 21, 1959

2,895,828

ELECTRONIC HEATING METHODS AND APPARATUS

Harris P. Kamide, Chicago, Ill., assignor to General Electric Company, a corporation of New York Application February 6, 1958, Serial No. 713,742

19 Claims. (Cl. 99—1)

The present invention relates to electronic heating methods and apparatus, and more particularly to such methods and apparatus as applied to the cooking of food products.

Heretofore the electronic cooking process has been subject to the criticism that, while it is exceedingly fast, it is not productive of the desired browning of the exterior surfaces of food products, that serves to seal the flavors and aromas into the food products in the cooking process, and that is largely responsible for the appetizing appearance of many such food products.

Accordingly, it is a general object of the invention to provide an improved electronic method of cooking food products that possesses both the desired deep cooking effect and the desired shallow cooking effect, whereby the method is characterized by both an exceedingly high cooking speed and by a browning of the exterior surfaces of the food products.

Another object of the invention is to provide an improved method of an apparatus for heating dielectric materials that is simple and economical in operation.

Another object of the invention is to provide an improved method of heating dielectric materials that involves the use of two distinct and related ultra-high frequency electromagnetic wave energy sources.

A further object of the invention is to provide improved apparatus for heating dielectric materials that incorporates two oscillators that are operative to produce two corresponding and related ultra-high frequency electromagnetic waves in the heating chamber thereof.

A further object of the invention is to provide heating apparatus of the character noted, that incorporates an improved control circuit arrangement for selectively governing the operation of the two oscillators mentioned so that either of the two corresponding heating effects thereof, or various combinations of the two corresponding heating effects, may be selectively preset, as desired by the operator.

A still further object of the invention is to provide in electronic heating apparatus of the character noted, an improved and simplified circuit arrangement therefor.

Further features of the invention pertain to the particular arrangement of the steps of the method and of the elements of the apparatus, whereby the above-outlined and additional operating features thereof are attained.

The invention, both as to its organization and method of operation, together with further objects and advantages will best be understood by reference to the following specification taken in connection with the accompanying drawings, in which:

Figures 1 and 2, taken together, are a diagrammatic illustration of an electronic cooking oven and control circuit therefor embodying the present invention; and Fig. 3 is a graphic illustration of a control characteristic of one of the program controllers incorporated in the control circuit of Figs. 1 and 2.

In order to form a unified diagram of the control circuit, Figs. 1 and 2 should be arranged horizontally in respective upper and lower positions.

Referring now to Figs. 1 and 2 of the drawings, the electronic heating system there illustrated, and embodying the features of the present invention, comprises an electronic range 10 that may be of any suitable type. As illustrated, the range 10 comprises a metallic enclosure including a housing section 11 provided with an open front, and a front door section 12, and defining an oven cavity or chamber 13, the front door section 12 being mounted adjacent to the lower edge thereof upon the housing section 11, for movements between a substantially vertical closed position and a substantially horizontal open position. The housing section 11 comprises a metal inner liner 14 and a metal outer shell 15 arranged generally in spaced-apart relation with thermal insulation 16 therebetween; and similarly, the door section 12 comprises a metal inner liner 17 and a metal outer shell 18 arranged generally in spaced-apart relation with thermal insulation 19 therebetween. First electromagnetic wave energy may be supplied to the oven cavity 13 via a transmission line 21, and second electromagnetic wave energy may be supplied to the oven cavity 13 via a transmission line 31. The line 21 may be of the coaxial conductor type, including an exterior tubular grounded metal sheath 22 and an interior rod-like ungrounded metal conductor 23, the extreme outer end of the sheath 22 being electrically connected to the shell 15 and to the liner 14 of the housing section 11, and the extreme outer end of the conductor 23 projecting through aligned openings provided in the shell 15 and in the liner 14 of the housing section 11 and into the oven chamber 13 and constituting an antenna 23a for radiating the first electromagnetic wave energy into the oven chamber 13. Similarly, the line 31 may be of the coaxial conductor type, including an exterior tubular grounded metal sheath 32 and an interior rod-like ungrounded metal conductor 33, the extreme outer end of the sheath 32 being electrically connected to the shell 15 and to the liner 14 of the housing section 11, and the extreme outer end of the conductor 33 projecting through aligned openings provided in the shell 15 and in the liner 14 of the housing section 11 and into the oven chamber 13 and constituting an antenna 33a for radiating the second electromagnetic wave energy into the oven chamber 13.

The control circuit comprises a first ultra-high frequency generator or oscillator 20, including a magnetron 24, and a second ultra-high frequency generator or oscillator 30, including a magnetron 34. The magnetron 24 is tuned to a first frequency $f_1$ in the ultra-high frequency band (such, for example, as 915 mc.), and the plate thereof is connected to the inner conductor 23 of the transmission line 21; and similarly, the magnetron 34 is tuned to a second frequency $f_2$ in the ultra-high frequency band (such, for example, as 2450 mc.) and the plate thereof is connected to the inner conductor 33 of the transmission line 31. Accordingly, the spread between $f_1$ and $f_2$ is at least 1000 mc. this spread being 1535 mc. in the present example. The main circuit of the oscillator 20, including the magnetron 24, is supplied with power via a pair of main terminals to which two conductors 185 and 186 are connected; and the auxiliary circuit, not shown, of the oscillator 20, is supplied with power via a pair of auxiliary terminals to which two conductors 181 and 182 are connected. Similarly, the main circuit of the oscillator 30, including the magnetron 34, is supplied with power via a pair of main terminals to which two conductors 187 and 188 are connected; and the auxiliary circuit, not shown, of the oscillator 30 is supplied with power via a pair of auxiliary terminals to which two conductors 183 and 184 are connected.

Further, the range 10 is provided with a door switch 175, that includes a contact bridging member 176, the door switch 175 being moved into its respective closed and open positions in response to corresponding movements of the front door section 12 into its closed and open positions. In the range 10 the transmission lines 21 and 31 may terminate upon the rear wall of the metal inner liner 15; and in the arrangement illustrated, the antenna 23a of the transmission line 21 is disposed immediately above the antenna 33a of the transmission line 31; and a metal baffle 14a is electrically connected to the rear wall of the metallic inner liner 14 and projects forwardly into the oven chamber 13 in shielding relation with respect to the antennae 23a and 33a. This arrangement minimizes cross-feed-back of electromagnetic wave energy from the oven chamber 13 into the transmission line 21 and 31. Also the adjacent positions of the antennae 23a and 33a upon the rear wall of the metal inner liner 14, with the baffle 14a therebetween, further minimizes the cross-feed-back of the electromagnetic wave energy mentioned. This feature is highly desirable, in that the magnetron 24 might otherwise be damaged by the feed-back of the electromagnetic wave energy of the frequency $f_2$ thereinto; and similarly, the magnetron 34 might otherwise be damaged by the feed-back of the electromagnetic wave energy of the frequency $f_1$ thereinto.

Also the control circuit comprises a deep heat program controller 40, a shallow heat program controller 70, and a combination deep and shallow heat program controller 100; which controllers 40, 70 and 100 may be of the same fundamental construction.

Specifically, the deep heat program controller 40 comprises a rotatably mounted operating shaft 41 carrying a manually operable dial 42 on the outer end thereof that cooperates with an associated index marker 43, the dial 42 having an off position and carrying suitable time indicia that may be calibrated in terms of minutes. Also, the program controller 40 is provided with a timer motor 44 having an operating shaft 45 connected to associated escapement mechanism 46 that is provided with an operating shaft 47, which shafts 47 and 41 are interconnected by a friction clutch 48. Further, the operating shaft 41 carries a plurality of insulating control cams 51, 52, 53 and 54. The cam 51 controls two switch springs 61 and 62; the cam 52 controls two switch springs 63 and 64; the cam 53 controls two switch springs 65 and 66; and the cam 54 controls two switch springs 67 and 68. In the arrangement, when the manual dial 42 is rotated in the clockwise direction out of its off position, in accordance with a time setting, the cam 54 controls the switch springs 67 and 68, so as to govern the timer motor 44; whereby the escapement mechanism 46 returns the shaft 41 step by step in the counterclockwise direction back toward its off position. For example, the escapement mechanism 46 may effect each minute one step of rotation in the counterclockwise direction of the operating shaft 47; whereby the operating shaft 41 is correspondingly rotated one step in the counterclockwise direction through the associated friction clutch 48. Of course, the operating shaft 41 is returned in the counterclockwise direction back into its off position after the expiration of a time interval corresponding to that preset upon the manual dial 42; whereby the cam 54 controls the switch springs 67 and 68 to arrest further operation of the timer motor 44, so that further rotation of the manual dial 42 is arrested when it is returned in the counterclockwise direction back into its off position.

The shallow heat program controller 70 is identical to the deep heat program controller 40 described above; whereby it comprises the corresponding elements 71, 72, 73, 74, 75, 76, 77 and 78; and the operating shaft 71 carries the control cams 81, 82, 83 and 84. The cam 81 controls two switch springs 91 and 92; the cam 82 controls two switch springs 93 and 94; the cam 83 controls two switch springs 95 and 96; and the cam 84 controls two switch springs 97 and 98.

The combination deep and shallow heat program controller 100 is substantially identical to the deep heat program controller 40 described above; whereby it comprises the corresponding elements 101, 102, 103, 104, 105, 106, 107 and 108; and the operating shaft 101 carries the control cams 111, 112, 113, 114 and 115. The cam 111 controls three switch springs 121, 122 and 123; the cam 112 controls three switch springs 124, 125 and 126; the cam 113 controls a push rod 127 that governs five switch springs 128, 129, 130, 131 and 132; the cam 114 controls two switch springs 147 and 148; and the cam 115 forms a part of a cycle switch 133 that is peculiar to the program controller 100.

More particularly, the cycle switch 133 further comprises a collar 134 mounted for oscillatory movement upon a hub 135; which collar 134 carries a radially extending control arm 136 that bears upon the exterior control surface of the cam 115, which has substantially the configuration of a spiral or Archimedes. Further, the collar 134 carries a pair of angularly spaced-apart and radially extending arms 137 and 138 that respectively carry two contact segments 139 and 140 that are respectively pivotally mounted upon the outer ends thereof. Further, the cycle switch 133 is provided with a contact wiper 141 that is mounted at the inner end thereof upon an oscillating shaft 142 arranged concentrically within the hub 135; which contact wiper 141 is arranged to cooperate alternately with the contact segments 139 and 140; and which contact wiper 141 carries a push rod 143 that cooperates with an eccentric 144 carried by a drive shaft 145 connected to a gear train 146 that is provided with a drive shaft 149 of an electric timer motor 154.

In the operation of the cycle switch 133, the angular position of the collar 134 is governed by the control cam 115 carried by the operating shaft 101 of the program controller 100; and in the arrangement, the collar 134 is biased in the counterclockwise direction by an associated coil spring 155. Specifically, when the operating shaft 101 is set in the clockwise direction out of its off position, a lower contour of the control cam 115 is presented to the control arm 136, so that the coil spring 155 rotates the collar 134 in the counterclockwise direction. On the other hand, when the operating shaft 101 is returned in the counterclockwise direction back toward its off position, a higher contour of the control cam 115 is presented to the control arm 136, so that the collar 134 is rotated in the clockwise direction against the bias of the coil spring 155. Also as the driven shaft 145 is rotated, the eccentric 144 bearing upon the push rod 143 oscillates the contact wiper 141, together with the cooperation between the contact wiper 141 and an associated coil spring 156. In the arrangement, the timer motor 154 may comprise a synchronous motor and the gear train 146 may be arranged so that the driven shaft 145 is rotated at exactly ½ r.p.m. Accordingly, the cycle switch 133 is operated periodically at the rate of one complete cycle per two minutes, the contact wiper 141 being oscillated at this rate by the eccentric 144 and the angular positions of the contact segments 139 and 140 with respect to the contact wiper 141 are controlled in accordance with the setting of the manual dial 102 of the program controller 100 by the cam 115. As illustrated, when the manual dial 102 occupies a set position near its off position, the cycle switch 133 is set so that in each half cycle thereof the contact wiper 141 engages the contact segment 140 for a relatively long time interval and engages the contact segment 139 for a relatively short time interval. On the other hand, when the manual dial 102 occupies a set position remote from its off position, the cycle switch 133 is set so that in each half cycle thereof the contact wiper 141 engages the contact segment 140 for a relatively short time interval and engages the contact segment 139 for a relatively long time interval. In other words, the split of the overall time interval of one minute (½ cycle of the cycle switch 133) is divided between the engagements of the contact wiper 141 with the respective contacts 139 and 140 in accordance with the rotary position of the collar 134, that in turn is established in accordance with the setting of the program controller 100; and specifically, the time interval of engagement of the contact segment 140 is relatively long when the manual dial 102 occupies a set position near its off position, and the time interval of the engagement of the contact segment 140 is relatively short when the manual dial 102 occupies a set position remote from the off position. Of course, the relationship of the contact wiper 141 with respect to the contact segment 139 is the reverse, or complement, of that described above and dependent upon the time setting of the manual dial 102, as described.

Moreover, the proportionment of the time interval of one minute may be further controlled by the relative pivotal positions of the contact segments 139 and 140 with respect to the outer ends of the respective control arms 137 and 138. The last-mentioned arrangement accommodates simultaneous engagement of the contact wiper 141 with the contact segments 139 and 140 in its motion from one of the contact segments to the other; and also the last-mentioned arrangement accommodates a distinct disengagement of the contact wiper 141 with both of the contact segments 139 and 140 in its motion from one of the contact segments to the other. The utility of the various adjustments incorporated in the cycle switch 133 is described with greater particularity hereinafter in conjunction with the control of the oscillators 20 and 30, and with reference to Fig. 3.

Further, the circuit arrangement comprises a relay 160 for controlling the supply of power to the main terminals of the oscillator 20, a relay 170 for controlling the supply of power to the main terminals of the oscillator 20, and a source of electric power supply of the 3-wire Edison type of 236 volts, single-phase, A.-C., including two outside conductors 151 and 152 and a grounded neutral conductor 153.

In the circuit arrangement: the conductor 151 is commonly connected to the switch springs 61, 91 and 121; the conductor 152 is commonly connected to the switch springs 63, 93 and 124. The switch springs 62 and 64 are respectively connected to the conductors 181 and 182; the switch springs 92 and 94 are respectively connected to the conductors 183 and 184; the switch springs 122 and 125 are respectively connected to the conductors 181 and 182; and the switch springs 123 and 126 are respectively connected to the conductors 183 and 184. The relay 160 comprises two contact bridging members 161 and 162; the contacts of the pair associated with the bridging member 161 respectively terminate the conductors 181 and 185, and the contacts of the pair associated with the bridging member 162 respectively terminate the conductors 182 and 186. The relay 170 comprises two contact bridging members 171 and 172; the contacts of the pair associated with the bridging member 171 respectively terminate the conductors 183 and 187, and the contacts of the pair associated with the bridging member 172 respectively terminate the conductors 184 and 188.

The switch springs 65 and 66 are respectively connected to two conductors 190 and 191; the switch springs 95 and 96 are respectively connected to the conductor 190 and to a conductor 192; the switch springs 128, 129, 130, 131 and 132 are respectively connected to the conductor 190, a conductor 189, a conductor 193, a conductor 194 and to the grounded neutral conductor 153. The switch springs 67 and 68 are respectively connected to a conductor 195 and to the conductor 190; the switch springs 97 and 98 are respectively connected to a conductor 196 and to the conductor 190; and the switch springs 147 and 148 are respectively connected to a conductor 197 and to the conductor 193. The contacts associated with the bridging member 176 of the door switch 175 respectively terminate the conductors 151 and 189; the wiper 141 of the cycle switch 133 is connected to the conductor 193; and the contact segments 139 and 140 of the cycle switch 133 are respectively connected to the conductors 191 and 192. The winding of the relay 160 is connected across the conductor 191 and the grounded neutral conductor 153; and the winding of the relay 170 is connected across the conductor 192 and the grounded neutral conductor 153. The timer motor 44 is connected across the conductors 194 and 195; the timer motor 74 is connected across the conductors 194 and 196; the timer motor 104 is connected across the grounded neutral conductor 153 and the conductor 197; and the timer motor 154 is connected across the grounded neutral conductor 153 and the conductor 197.

In the circuit arrangement, each of the timer motors 44, 74, 104 and 154 may be of the usual synchronous type, and preferably comprises a "Telechron" timer motor. Also it is reiterated that the escapement mechanisms 46, 76 and 106 respectively drive the operating shafts 41, 71 and 101 of the respective program controllers 40, 70 and 100 step by step at the rate of one step per minute; whereas the eccentric 144 may be rotated at the rate of ½ r.p.m. so that the cycle switch 133 is operated in its complementary half cycles at the rate of one of its half cycles per minute.

Before proceeding with a detailed description of the operation of the control circuit for the electronic range 10, it is well to consider a number of the electronic cooking effects that may be carried out therein. More particularly, in the cooking of certain food products of relatively small mass, the desired cooking effects can be readily achieved utilizing the relatively high frequency electromagnetic wave energy in the oven cavity 13 that is produced by operation of the oscillator 30; on the other hand, in the cooking of other food products of relatively large mass, the desired cooking effects can be best achieved by utilizing the relatively low frequency electromagnetic wave energy in the oven cavity 13 that is produced by operation of the oscillator 20; whereas in the cooking of still other food products the desired cooking effects can be best achieved by the utilization of a combination of the two electromagnetic wave sources mentioned. These considerations flow from the circumstance that the relatively low frequency of about 915 mc. is productive of a preferential deep cooking effect in the food product, whereas the relatively high frequency of about 2450 mc. is productive of a preferential shallow cooking effect in the food product. Also, the relatively high frequency mentioned is productive of desirable browning of the exterior surfaces of a food product; whereby some utilization of the last mentioned frequency is essential to the browning of breads, roasts, etc. For example, in the cooking of a large beef roast of about 20 pounds, a substantially ideal overall cooking effect may be achieved by the utilization of the relatively low frequency for about 20 minutes in combination with the relatively high frequency for about 5 minutes; which utilization of the two frequencies in the oven chamber 13 may be either sequential or concurrent, at the option of the cook. In this example, the utilization of the low frequency insures that the interior of the roast is about medium-well done, whereas the utilization of the high frequency insures that the exterior of the roast is well-done and also effects browning of the exterior surfaces of the roast.

Turning now to the general mode of operation of the control circuit: the deep heat program controller 40 is employed for the purpose of selectively setting the time interval of operation of the relatively low frequency oscillator 20, while the shallow heat program controller 70 is employed for the purpose of selectively setting the time interval of operation of the relatively high frequency oscillator 30. The combination deep and shallow heat program controller 100 is employed for the purpose of selectively setting the overall time interval of operation of both of the oscillators 20 and 30, the oscillators 20 and 30 being operated alternately under the control of the cycle switch 133, as explained more fully hereinafter. In this arrangement, it is pointed out in conjunction with the operation of the combination deep and shallow heat program controller 100, that the proportionment between the operations of the two oscillators 20 and 30 is determined by the particular setting of the manual dial 102, the control characteristic being effected in the cycle switch 133 and as illustrated in Fig. 3.

More particularly, when the manual dial 102 occupies a short time setting near its off position, the time interval of control of operation of the low frequency oscillator 20 is relatively small with respect to the time interval of operation of the high frequency oscillator 30 in each cycle of operation of the cycle switch 133; whereas, when the manual dial 102 occupies a long time setting remote from its off position, the time interval of control of operation of the low frequency oscillator 30 is relatively large with respect to the time interval of operation of the high frequency oscillator 30 in each cycle of operation of the cycle switch 133. In other words, as the manual dial 102 is set to progressively longer overall time intervals the ratio $(f_1/f_2)$ is increased as indicated in Fig. 3. These control effects are explained in greater detail hereinafter in conjunction with the operation of the combination deep and shallow heat program controller 100.

Now assuming that the range 10 is to be operated utilizing the relatively low frequency of the oscillator 20 in the cooking chamber 13 thereof, the food product is first placed in the oven chamber 13 and the front door section 12 is returned into its closed position so as to effect closure of the door switch 175. The cook then sets the corresponding deep heat program controller 40, and specifically the manual dial 42 is rotated in the clockwise direction out of its off position into its time setting position in accordance with the desired time interval. When the program controller 40 is thus operated out of its off position, the cam 51 closes the switch springs 61—62, the cam 52 closes the switch springs 63—64, the cam 53 closes the switch springs 65—66, and the cam 54 closes the switch springs 67—68. Closure of the switch springs 61—62 and 63—64 connects the power conductors 151 and 152 to the respective conductors 181 and 182, thereby directly to supply power to the auxiliary equipment in the oscillator 20. Closure of the switch springs 65—66 completes a circuit for energizing the winding of the relay 160; which circuit may be traced from the line conductor 151 via the closed contact bridging member 176 of the door switch 175, the conductor 189, the switch springs 129—128, the conductor 190, the switch springs 65—66, the conductor 191 and the winding of the relay 160 to the neutral conductor 153. When thus energized, the relay 160 operates, whereby the contact bridging members 161 and 162 connect the conductors 181 and 182 respectively to the conductors 185 and 186 and thus to the main terminals of the oscillator 20; whereby oscillation thereof takes place, with the magnetron 24 supplying the electromagnetic wave energy to the transmission line 21 and thus to the oven cavity 13 for the cooking purpose.

Closure of the switch springs 67—68 completes an operating circuit for the timer motor 44, that includes the conductors 190, 195 and 194, together with the switch springs 131—132 and the grounded neutral conductor 153; whereby the operating timer motor 44 governs the escapement mechanism 46, with the result that the operating shaft 41 is returned back in the counterclockwise direction step by step and ultimately into its off position depending upon the initial setting of the manual dial 42. When the manual dial 42 is ultimately returned back into its off position at the conclusion of the preset time interval, the cams 51 and 52 open the respective switch springs 61—62 and 63—64 so as to interrupt the supply of power to the oscillator 20, the cam 53 opens the switch springs 65—66 so as to effect the restoration of the relay 160, and the cam 54 opens the switch spring 67—68 so as to arrest further operation of the timer motor 44. At this time, the deep heat program controller 40 has been returned back into its normal off position so as to bring about the termination of the cooking operation in the oven cavity 13 of the range 10.

In the deep heat program controller 40, the control position of the cam 53 may be slightly displaced with respect to the control positions of the cams 52, 53 and 54, so that when the manual dial 42 is operated out of its off position, the contacts 65—66 are closed slightly subsequent to the closure of the contacts 61—62 and 63—64; whereby the relay 160 operates subsequent to closure of the power upon the conductors 181 and 182. Conversely, when the manual dial 42 is operated back into its off position, the contacts 65—66 open slightly ahead of opening of the contact 61—62 and 63—64; whereby the relay 160 restores prior to opening of the power from the conductors 181 and 182. This arrangement insures that the circuit-making and circuit-breaking functions are performed at the contact bridging members 161 and 162 of the relay 160, the relay 160 constituting a power contactor.

Now assuming that the range 10 is to be operated utilizing the relatively high frequency of the oscillator 30 in the cooking chamber 13 thereof, the food product is first placed in the oven chamber 13 and the front door section 12 is returned into its closed position so as to effect closure of the door switch 175. The cook then sets the corresponding shallow heat program controller 70; and specifically, the manual dial 72 is rotated in the clockwise direction out of its off position into its time-set position in accordance with the desired time interval. The subsequent operation of the program controller 70 back into its off position under the control of the timer motor 74 is identical to that previously described in conjunction with the program controller 40. In this case: the cams 81 and 82 govern the connection of power to the conductors 83 and 84 and thus to the oscillator 30; the cam 83 governs the relay 170 to effect the connection of the power to the main terminals of the oscillator 30; while the cam 84 controls the timer motor 74 in order to effect the return of the program controller 70 back into its normal off position. Of course, in this case, the relay 170 is retained in its operated position throughout the preset time interval corresponding to the initially operated position of the manual dial 72 of the program controller 70, thereby effecting operation of the oscillator 30 throughout the preset time interval, with the result that the high-frequency electromagnetic wave energy is supplied to the oven cavity 13 of the range 10 for the cooking purpose.

Now assuming that the range 10 is to be operated utilizing a combination of the relatively low frequency of the oscillator 20 and the relatively high frequency of the oscillator 30, after placing the food product in the oven cavity 13, the cook selectively sets the combination deep and shallow heat program controller 100 and more particularly the manual dial 102 is rotated in the clockwise direction out of its off position into a time setting position corresponding to the desired cooking time interval. In this case, the cam 111 closes the switch spring 121 to the switch spring 122 and the latter switch spring to the switch spring 123, so as to connect the line conductor 151 to both of the conductors 181 and 183; and the cam 112 closes the switch spring 124 to the switch spring 125 and the latter switch spring to the switch spring 126 so as to connect the line conductor 152 to both of the conductors 182 and 184. Also, the cam 113 opens the switch spring 129 from the switch spring 128, closes the switch spring 129 to the switch spring 130, and opens the switch spring 132 from the switch spring 131. Opening of the switch springs 128—129 and 131—132 insures that the timer motors 44 and 74 are not operated at this time and locks-out the controls of the program controllers 40 and 70 with respect to the relays 160 and 170. Closure of the switch springs 129—130 connects the line conductor 151, via the closed door switch 175 and the conductor 189, to the conductor 193. The cam 114 closes the switch springs 147—148 thereby completing parallel circuits for operating the timer motors 104 and 154. The operating timer motor 104 effects the return of the operating shaft 101 of the program controller 100 step by step in the counterclockwise direction back into its off position at the expiration of the preset time interval upon the manual dial 102, the operating shaft 101 being returned back into its off position step by step through the escapement mechanism 106 and the associated friction clutch 108.

The operating timer motor 154 effects rotation of the eccentric 144 one revolution each two minutes through the gear train 146; whereby the contact wiper 141 is correspondingly oscillated periodically through the cooperation of the pushrod 143 riding upon the surface of the eccentric 144. Accordingly, the contact wiper 144 completes half of its cycle each minute, thereby dividing this time interval between contact with the contact segments 140 and 139, in the manner previously explained. When the wiper 141 engages the contact segments 139 and 140, the power in the conductor 193 is respectively connected to the conductors 191 and 192; whereby the relays 160 and 170 are correspondingly respectively operated. Normally the contact wiper 141 alternately engages the contact segments 139 and 140, as previously explained; whereby the relays 160 and 170 are operated alternately, thereby to render the oscillators 20 and 30 operative alternately, so that the oven cavity 13 of the range 10 is correspondingly alternately supplied with the relatively low frequency electromagnetic wave energy and the relatively high frequency electromagnetic wave energy. Hence, in this case, the food product arranged in the oven cavity 13 is alternately cooked with the two sources of ultra-high frequency for the purpose previously explained.

As the operating shaft 101 of the program controller 100 is returned back toward its off position the cam 113 governs the follow-up arm 136 so as progressively to adjust the cycle switch 133 in order to decrease the proportion of the frequency $f_1$ and to increase the proportion of the frequency $f_2$ that is supplied to the oven cavity 13, as previously explained and as illustrated in Fig. 3.

As previously noted, in conjunction with the description of the general mode of operation of the cycle switch 133, the contact segments 139 and 140 may be individually adjusted upon the outer ends of the control arms 137 and 138 so as to provide an overlap in the engagements of the contact segments 139 and 140, thereby to obtain a short time interval during which both of the relays 160 and 170 are operated in the cycle of operation of the cycle switch 133. Also the contact segments 139 and 140 may be selectively adjusted so as to provide a time gap between the engagements of the contact segments 139 and 140, thereby to obtain a short time interval during which both of the relays 160 and 170 are restored in the cycle of operation of the cycle 133. Ordinarily the adjustments of the contact segments 139 and 140 upon the respective control arms 137 and 138 comprise factory adjustments, or at least adjustments that are made by the serviceman rather than by the cook.

Upon the return of the program controller 100 back into its off position, the cam 113 opens the switch springs 129—130 and recloses the switch springs 128—129 and 131—132; whereby power is removed from the conductor 193 so as to effect the restoration of the relays 160 and 170 and the consequent arresting of operation of the oscillators 20 and 30. The cam 111 opens the switch springs 121, 122 and 123 and the cam 112 opens the switch springs 124, 125 and 126, thereby to remove power from the conductors 181—182 and 183—184, so as to deenergize the auxiliary circuits of the oscillators 20 and 30. Further, the cam 114 opens the switch springs 147—148, so as to arrest operations of the timer motors 104 and 154. Operation of the timer motor 104 is arrested with the program controller 100 back in its normal position; and operation of the timer motor 154 is arrested to arrest operation of the cycle relay 133.

Again considering the general mode of control of the circuit, it is pointed out that the controls exercised by the program controllers 40 and 70 are entirely independent of each other; whereby these two program controllers may be set independently of each other for corresponding independent time intervals, so as to bring about the simultaneous operations of the oscillators 20 and 30, if desired. In this case, the oscillator 20 is operated under the control of the program controller 40 and the oscillator 30 is operated under the control of the program controller 70.

On the other hand, the setting of the combination deep and shallow heat program controller 100 prevents operation of the two program controllers 40 and 70, since the cam 113 carried by the operating shaft 101 of the program controller 100 opens the switch springs 128—129 and 131—132 incident to setting of the program controller 100. Accordingly, the program controller 100 is arranged in overriding relation with respect to the program controllers 40 and 70. However, when the program controller 100 is returned into its normal off position, the cam 113 again effects closure of the sets of switch springs 128—129 and 131—132; whereby either or both of the program controllers 40 and 70 are rendered again effective to control the respective oscillators 20 and 30. Hence, it will be understood that either or both of the program controllers 40 and 70 may be selectively set in conjunction with the program controller 100, and that after the program controller 100 has effected its control and has been returned back into its normal off position, then the preset one or both of the program controllers 40 and 70 are operated to effect the controls in the manner previously explained.

As previously pointed out, when the two oscillators 20 and 30 are operated simultaneously, the two frequencies $f_1$ and $f_2$ are supplied to the oven cavity 13 of the range 10; however cross-feed-back from the oven cavity 13 to the magnetrons 24 and 34 of the respective oscillators 20 and 30 is minimized and rendered of no consequence by virtue of the terminating positions of the transmission lines 21 and 31 upon the rear wall of the metal inner liner 14 of the oven cavity 13 and by the disposition of the metal baffle 14a projecting between the antennae 23a and 33a in shielding relation therewith, as previously explained.

In view of the foregoing, it is apparent that there has been provided an improved method of and apparatus for effecting heating of dielectric materials; and specifically an improved electronic cooking oven has been provided in which both deep heating effects and shallow heating effects may be carried out simultaneously, sequentially or alternately by appropriate controls of the program controllers provided for this purpose. The method and the apparatus are particularly advantageous in the cooking of food products in that both fast cooking, as well as browning of the exterior surfaces of the food products, can be achieved altogether by the electronic sources of power; which effects are realized by virtue of the fact that while both of the frequencies employed are in the ultra-high frequency band, the spread between the two frequencies is at least 1000 megacycles.

In the foregoing description of the method and the heating apparatus, the suggested frequencies of 915 mc.

and the 2450 mc. have been recommended although it is noted that equally desirable results may be obtained when the higher frequency is as high as 10,000 mc. Specifically, the important feature in this regard is that the relatively low frequency should be sufficiently low in the ultra-high frequency band to be characterized by a preferential deep heating effect, while the relatively high frequency should be sufficiently high in the ultra-high frequency band to be characterized by a preferential shallow heating effect, as well as browning effect.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of cooking a food product comprising arranging the food product in a chamber defined by a wall formed of an electrical conductor, and permeating said chamber with first electromagnetic wave energy of an ultra-high frequency $f_1$ characterized by a preferential deep cooking effect upon the food product and with second electromagnetic wave energy of an ultra-high frequency $f_2$ characterized by a preferential shallow cooking effect upon the food product, wherein the spread between $f_1$ and $f_2$ is at least 1000 mc. so that said deep cooking effect and said shallow cooking effect are separate and distinct with respect to each other.

2. The method set forth in claim 1, wherein $f_1$ is about 1000 mc. and $f_2$ is about 2500 mc.

3. The method set forth in claim 1, wherein said chamber is permeated simultaneously with said first electromagnetic wave energy and said second electromagnetic wave energy.

4. The method set forth in claim 1, wherein said chamber is permeated successively with said first electromagnetic wave energy and said second electromagnetic wave energy.

5. The method set forth in claim 1, wherein said chamber is permeated cyclically alternately with said first electromagnetic wave energy and said second electromagnetic wave energy.

6. The method of cooking a food product comprising arranging the food product in a chamber defined by walls formed of an electrical conductor, presetting a first time interval corresponding to a desired deep cooking effect in the food product, presetting a second time interval corresponding to a desired shallow cooking effect in the food product, supplying said chamber with first electromagnetic wave energy of an ultra-high frequency $f_1$ characterized by a preferential deep cooking effect upon the food product during said preset first time interval, supplying said chamber with second electromagnetic wave energy of an ultra-high frequency $f_2$ characterized by a preferential shallow cooking effect upon the food product during said preset second time interval, wherein the spread between $f_1$ and $f_2$ is at least 1000 mc. so that said desired cooking effect and said shallow cooking effect are separate and distinct with respect to each other.

7. Heating apparatus comprising walls formed of an electrical conductor and defining a chamber, a first oscillator operative to supply to said chamber first electromagnetic wave energy of a frequency $f_1$, a second oscillator operative to supply to said chamber second electromagnetic wave energy of a frequency $f_2$, wherein both $f_1$ and $f_2$ are in the ultra-high frequency band and the spread between $f_1$ and $f_2$ is at least 1000 mc., and means for selectively controlling the operations of said oscillators independently of each other so that said oscillators may be operated either successively or simultaneously.

8. Heating apparatus comprising walls formed of an electrical conductor and defining a chamber, a first oscillator operative to supply to said chamber first electromagnetic wave energy of a frequency $f_1$, a second oscillator operative to supply to said chamber second electromagnetic wave energy of a frequency $f_2$, wherein both $f_1$ and $f_2$ are in the ultra-high frequency band and the spread between $f_1$ and $f_2$ is at least 1000 mc., a source of electric power supply and means for selectively connecting and disconnecting said power source with respect to said oscillators independently of each other so that said oscillators may be operated either successively or simultaneously.

9. Heating apparatus comprising walls formed on an electrical conductor and defining a chamber, a first oscillator operative at a frequency $f_1$, a second oscillator operative at a frequency $f_2$, wherein both $f_1$ and $f_2$ are in the ultra-high frequency band and the spread between $f_1$ and $f_2$ is at least 1000 mc., a first transmission line connecting said first oscillator to said chamber to supply corresponding first electromagnetic wave energy thereto, a second transmission line connecting said oscillator to said chamber to supply corresponding second electromagnetic wave energy thereto, means for selectively controlling the operations of said oscillators independently of each other so that said oscillators may be operated either successively or simultaneously, and means for minimizing cross-feed-back of electromagnetic wave energy into said transmission lines when said oscillators are operated simultaneously.

10. The heating apparatus combination set forth in claim 9, wherein said means for minimizing cross-feed-back of electromagnetic wave energy into said transmission lines includes baffle structure formed of an electrical conductor and connected to the wall of said chamber and disposed between the delivery ends of said transmission lines in shielding relation therewith.

11. Heating apparatus comprising walls formed of an electrical conductor and defining a chamber, a first oscillator operative to supply to said chamber first electromagnetic wave energy of a frequency $f_1$, a second oscillator operative to supply to said chamber second electromagnetic wave energy of a frequency $f_2$, wherein both $f_1$ and $f_2$ are in the ultra-high frequency band and the spread between $f_1$ and $f_2$ is at least 1000 mc., means including a first manually settable timer for selectively controlling a first time interval of operation of said first oscillator, and means including a second manually settable timer for selectively controlling a second time interval of operation of said second oscillator, said two control means being independent of each other so that said oscillators may be operated either successively or simultaneously.

12. Heating apparatus comprising walls formed of an electrical conductor and defining a chamber, a first oscillator operative to supply to said chamber first electromagnetic wave energy of a frequency $f_1$, a second oscillator operative to supply to said chamber second electromagnetic wave energy of a frequency $f_2$, wherein both $f_1$ and $f_2$ are in the ultra-high frequency band and the spread between $f_1$ and $f_2$ is at least 1000 mc., and a manually settable timer for selectively controlling both an overall time interval of operation of said oscillators and a ratio between the operating time interval of said first oscillator and the operating time interval of said second oscillator within said overall time interval.

13. The heating apparatus set forth in claim 12, wherein said manually settable timer automatically increases said ratio as the length of said overall time interval is increased.

14. Heating apparatus comprising walls formed of an electrical conductor and defining a chamber, a first oscillator operative to supply to said chamber first electromagnetic wave energy of a frequency $f_1$, a second oscillator operative to supply to said chamber second electromagnetic wave energy of a frequency $f_2$, wherein both $f_1$ and $f_2$ are in the ultra-high frequency band and the spread between $f_1$ and $f_2$ is at least 1000 mc., a first manually settable controller for governing the operation of said first oscillator, a second manually settable controller for governing the operation of said second oscillator, and a third manually settable controller for governing the operation of both of said oscillators.

15. The heating apparatus set forth in claim 14, and further comprising means responsive to setting of said third controller for disabling both said first controller and said second controller.

16. Heating apparatus comprising walls formed of an electrical conductor and defining a chamber, a first oscillator operative to supply to said chamber first electromagnetic wave energy of a frequency $f_1$, a second oscillator operative to supply to said chamber second electromagnetic wave energy of a frequency $f_2$, wherein both $f_1$ and $f_2$ are in the ultra-high frequency band and the spread between $f_1$ and $f_2$ is at least 1000 mc., a cycle switch operative in each cycle thereof to operate alternately said oscillators, and a controller for selectively setting an overall time interval of operation of said cycle switch.

17. Heating apparatus comprising walls formed of an electrical conductor and defining a chamber, a first oscillator operative to supply to said chamber first electromagnetic wave energy of a frequency $f_1$, a second oscillator operative to supply to said chamber second electromagnetic wave energy of a frequency $f_2$, wherein both $f_1$ and $f_2$ are in the ultra-high frequency band and the spread between $f_1$ and $f_2$ is at least 1000 mc., a cycle switch operative between two positions in each cycle thereof, means controlled in one position of said cycle switch for operating said first oscillator, means controlled in the other position of said cycle switch for operating said second oscillator, and a controller for selectively setting an overall time interval of operation of said cycle switch.

18. Heating apparatus comprising walls formed of an electrical conductor and defining a chamber, a first oscillator operative to supply to said chamber first electromagnetic wave energy of a frequency $f_1$, a second oscillator operative to supply to said chamber second electromagnetic wave energy of a frequency $f_2$, wherein both $f_1$ and $f_2$ are in the ultra-high frequency band and the spread between $f_1$ and $f_2$ is at least 1000 mc., a cycle switch operative between two positions in each cycle thereof, adjustable mechanism for selectively setting the ratio of the two time intervals during which said cycle switch respectively occupies its two positions in each cycle of operation thereof, means controlled in one position of said cycle switch for operating said first oscillator, means controlled in the other position of said cycle switch for operating said second oscillator, and a controller for selectively setting an overall time interval of operation of said cycle switch and for selectively adjusting said mechanism.

19. The heating apparatus set forth in claim 18, wherein said controller is arranged to increase the ratio of the time interval of operation of said first oscillator with respect to the time interval of operation of said second oscillator in each cycle of operation of said cycle switch as the overall time interval of operation of said cycle switch is increased.

References Cited in the file of this patent

UNITED STATES PATENTS

| | | |
|---|---|---|
| 2,593,067 | Spencer | Apr. 15, 1952 |
| 2,605,383 | Spencer | July 28, 1952 |
| 2,632,090 | Revercomb et al. | Mar. 17, 1953 |
| 2,744,990 | Schroeder | May 8, 1956 |